July 7, 1959   W. N. GEIGER   2,893,146
MOUNT-FEEDING MEANS FOR PROJECTION MACHINES
Filed July 27, 1956
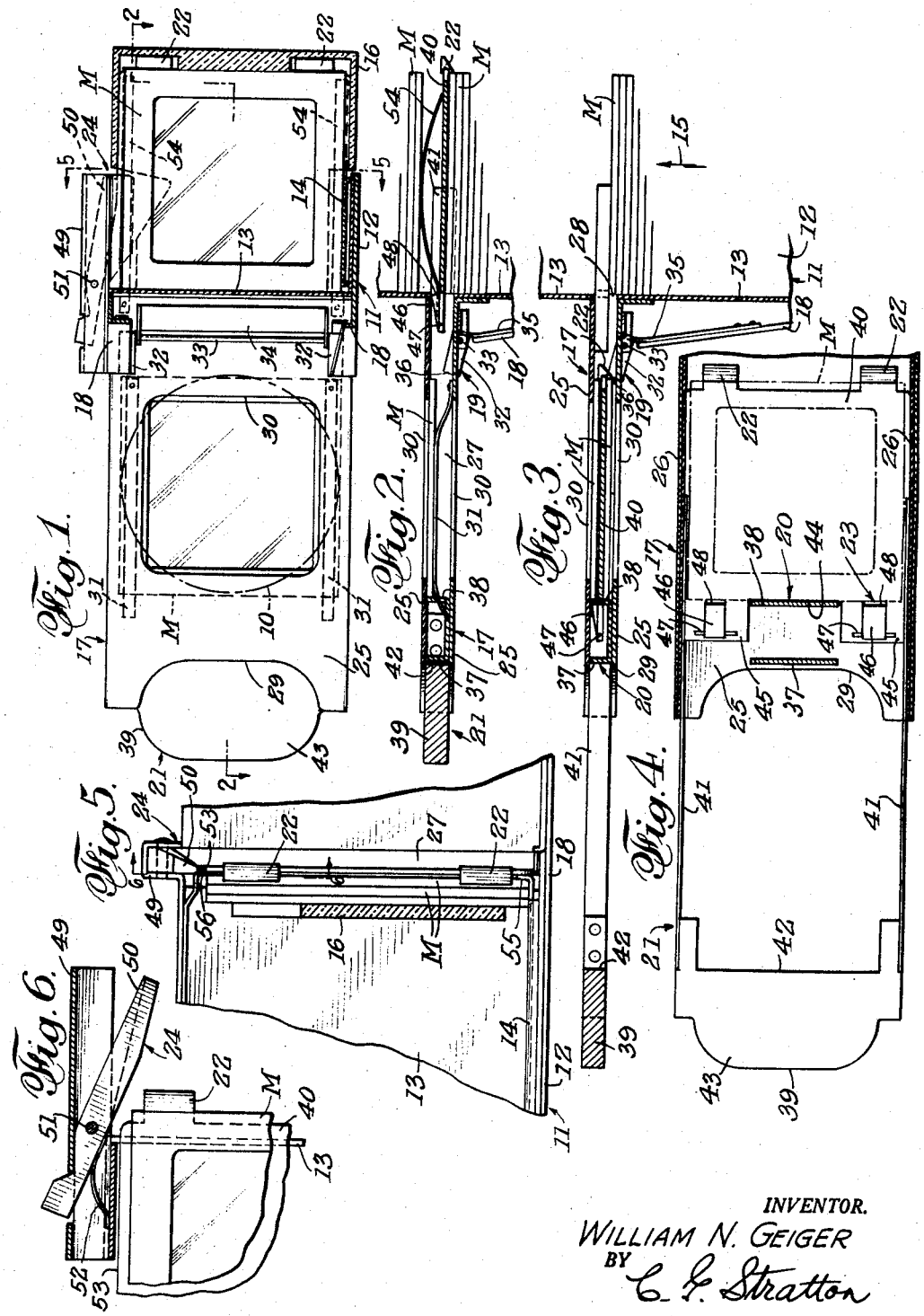
INVENTOR.
WILLIAM N. GEIGER
BY
ATTORNEY

United States Patent Office 2,893,146
Patented July 7, 1959

2,893,146

MOUNT-FEEDING MEANS FOR PROJECTION MACHINES

William N. Geiger, Glendale, Calif.

Application July 27, 1956, Serial No. 600,439

6 Claims. (Cl. 40—79)

This invention relates to means for feeding transparencies or mounts to projection machines, the invention contemplating successively moving the mounts of a stack thereof to projection position and, alternately with such feeding movement, returning the mounts, after projection thereof, to a tray from which they are fed. It is an object of this invention to provide novel and improved means for carrying out the above-indicated function.

Another object of the invention is to provide a reciprocative feeding device that may be manually or similarly operated, to feed a mount to projection position, using one stroke of the device, and returning a previously-projected mount, using the recovery stroke of the device, thereby providing a simple and easily operated device of the present character.

A further object of the invention is to provide novel feeding means in which improved mount-pulling means is employed, the same insuring efficient feed of the mounts to projection position.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

Fig. 1 is a vertical sectional view of a mount-feeding means according to the present invention, the same being shown with one mount in projection position and another about to be moved to such position.

Fig. 2 is a longitudinal sectional view as taken on line 2—2 of Fig. 1.

Fig. 3 is a sectional view on the plane of section of Fig. 2, showing the present means with a mount moved to projection position and before the previously-projected mount has been returned.

Fig. 4 is a vertical sectional view of the mechanism as shown in Fig. 3.

Fig. 5 is an enlarged vertical sectional view as taken on line 5—5 of Fig. 1.

Fig. 6 is a vertical sectional view as taken on line 6—6 of Fig. 5.

The present feeding means is operatively associated with a projection machine that is suggested by the optical unit 10, the same also being used to mount said means so that a mount or transparency M is positioned to be projected through said unit 10. The usual lamp house that provides the projecting illumination is not shown. Also, the present feeding means is operatively associated with a slide 11 that comprises a base plate 12 and a back wall 13. A slide plate 14 is carried by the base plate 12, the mounts M being supported on said slide plate as shown in Fig. 1, and biased in the direction of arrow 15.

In this instance, the mounts M are shown as stacked in a tray 16. The present novel feeding means displaces a mount from said tray and places the same in projection position, and then returns the mount to the tray.

The mount-feeding means that is illustrated comprises, generally, a channel housing 17 that is connected by upper and lower brackets or braces 18 to the slide 11, dog means 19 carried by said housing adjacent the end thereof connected to the slide, a stop 20 to limit the feed movement of the mounts, a ram unit 21 manually slidable in said channel housing and provided with mount-feeding dogs 22, mount-returning dog means 23 carried by said ram unit, and means 24 to separate the mounts to be fed from the tray 16 and those already returned to the tray after projection thereof.

The channel housing 17 comprises similar flanged plates 25 that are nested by their upper and lower flanges 26 to form between them a channel or passage 27, the same opening at 28 on the slide 11, the wall 13 of said slide embodying said opening. The opposite ends of plates 25 are recessed, as at 29, to form a finger-accommodating concavity. Intermediate their ends, said plates 25 are provided with generally rectangular apertures 30 which are aligned.

As shown best in Figs. 1 and 2, the forward plate 25, above and below the aperture 30 therein, is provided with longitudinal flat and rearwardly bowed springs 31.

The dog means 19 is shown in Figs. 1, 2 and 3, the same being carried by the forward plate 25 adjacent the slide 11. As shown, said means comprises a pair of vertically spaced blocks 32 that reside in apertures formed in said plate 25 and are mounted on a common pivot pin 33. The latter is carried by a bracket 34 affixed to the forward face of said forward plate 25. A spring 35 is engaged with an end of each said block 32 to resiliently hold the opposite end 36 thereof projected angularly into the passage. Said block ends 36 constitute retractable abutments.

The stop 20 is shown as a channel-shaped member affixed to one of the plates 25 and having a pair of stop flanges 37 and 38, the former for limiting the inward position of the ram unit 21 and the latter limiting the projection position of a mount M to locate the same in register with apertures 30.

The ram unit 21 is shown as comprising an operating handle 39, a feed plate 40 on which are carried the mount-feeding dogs 22, and upper and lower connecting bars 41 that connect the handle 39 and feed plate 40.

The handle 39 is formed with an edge 42 that engages top flanges 37 to limit the retracted position of the ram unit 21, and with a finger-gripping extension 43 opposite to said edge.

The feed plate 40 is generally rectangular and the same, as best seen in Fig. 4, has an edge 44 that engages stop flange 38 to limit the extended or projected positions of the ram unit. Above and below said edge 44, plate 40 is formed to have lateral extensions 45. The dogs 22 are carried by the opposite edge of plate 40 and the same are generally aligned with said extensions 45. It will be understood that when the handle edge 42 is abutted on stop 37, the dogs 22 engage behind a mount M on the slide 11, as clearly shown in Fig. 2.

The connecting bars 41 are formed of strip metal having the width of passage 27 and, therefore, being guided in said passage. The feed plate 40 is secured at its top and bottom edges to said bars and is held thereby to be centered on the width of the passage, as shown in Figs. 2 and 3. Since said plate 40 is quite thin, there is ample space to accommodate a mount M on each side of said plate, as particularly shown in Fig. 3.

The mount-returning dog means 23 is carried by the extensions 45 and can best be seen in Fig. 4. Said means comprises two freely pivoted dogs 46 on pivots 47 and having abutment ends 48 that are directed toward and are opposite to the feed dogs 22.

The separating means 24 is carried by a hood 49 affixed to the upper connecting brace 18 and extending laterally over the slide 11 and above the slide plate 14 thereof. Said means is shown as an arm 50, carried on a pivot 51 by the hood 49, and biased by a spring 52 to move in the path of mounts in the tray 16 to separate those on one side from those on the opposite side. When feed plate 40 is at the beginning of its feed stroke, the upper edge 53 thereof engages arm 50 and holds the same elevated, as in Figs. 1 and 5. When said plate 40 is withdrawn in a mount-feeding movement, the biasing springs 52 will move said arm 50 to mount-separating position.

The plate 40 is provided with similar upper and lower flat springs 54 that are generally similar to springs 31, the same pressing the returned mounts to separation position (Fig. 2) when the arm 50 is raised and the plate 40 is at the beginning of its feeding position. Such separation of the mounts insures a clear path of return of a mount from projection position, it being the function of said arm 50 to hold the returned mounts away from such path.

As can be seen in Fig. 5, the slide plate 14 is provided with a mount-limiting stop 55 and a similar stop 56 is provided at the upper end, said stops cooperating to hold a mount M in position to be engaged by feed dogs 22 and in alignment with passage 27.

Starting with the position of Figs. 1 and 2, wherein a mount is in projection position in housing 17 and is pressed rearwardly by springs 31 against the rearward plate 25 of said housing, and wherein the feed dogs 22 are engaged over the edge of a mount in tray 16 and supported on slide plate 14, the handle 39 is pulled to the left so that said dogs 22 will transpose the latter mount to a position in register with apertures 30 as controlled by stop flange 38. This condition is shown in Figs. 3 and 4 and it will be realized that plate 40 will shut off the projection light while the two mounts are disposed, one on each side of said plate, in register with the projection apertures.

In this latter condition, springs 31 will be flattened out by the oncoming mount to press thereagainst, springs 54 will be flattened out by engagement with the forward face of the mount originally in the housing 17, the arm 50 will drop to separating position, and the return dogs 46 will slide past said original mount and engage the left edge thereof. During this movement of the ram unit 21, the oncoming mount deflected the dogs 32 forwardly out of the path of movement and, when the latter mount reached projection position, the springs 35 became effective to again move the abutments 36 of dogs 32 into the passage 27 and in overstanding relationship to the trailing edge of said latter mount.

Now, when the handle 39 is pushed inward, as limited by stop flange 37, dogs 32 will hold the newly positioned mount against retractive movement while dogs 46 return the originally positioned mount to the slide 11 and into tray 16. As the plate 40 and the mount propelled thereby are moved out of register with the retained mount, the latter is pressed by springs 31 toward the rearward housing plate 25, the arm 50 is raised out of separating position, and springs 54 expand to hold the separation. Thus, the position of Figs. 1 and 2 is reachieved, but with a new mount in projection position.

Thus, a set of mounts may be successively moved into and out of projection position by reciprocative movement of the handle 39. At the beginning, the ram will return empty and at the end, the ram will be empty when being projected but, at all other times, one stroke of the ram feeds a mount and the return stroke removes a mount previously fed.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described my invention, what I claim and desire to secure by Letters Patent is:

1. Mount-feeding means comprising a housing having a passage fully open at one end and partly open at the other end, light-passing apertures in said housing intermediate its ends, a ram unit longitudinally movable in said passage and provided with a feed plate movable between a position extending through said fully open end of the housing, and a position in register with said apertures, said ram being provided with a handle extending from said feed plate through the partly open end of the housing, said handle closing said end of the housing when said feed plate is in the position beyond the fully open end of the housing, first dog means on said plate to engage an edge of a mount to move the same between a position outside and beyond the fully open end of said housing and a position within the housing and in register with said light-passing apertures, second dog means on said plate to engage an edge of a mount to move the same between a position within the housing and in register with said apertures and a position outside and beyond the fully open end of said housing, and a third dog means carried by the housing to retain one mount within said housing while another is being moved to an outer position.

2. Mount-feeding means comprising a housing having a passage fully open at one end and partly open at the other end, light-passing apertures in said housing intermediate its ends, a ram unit longitudinally movable in said passage and provided with a feed plate movable between a position extending through said fully open end of the housing and a position in register with said apertures, said ram being provided with a handle extending from said feed plate through the partly open end of the housing, said handle closing said end of the housing when said feed plate is in the position beyond the fully open end of the housing, first dog means on said plate to engage an edge of a mount to move the same between a position outside and beyond the fully open end of said housing and a position within the housing and in register with said light-passing apertures, second dog means on said plate to engage an edge of a mount to move the same between a position within the housing and in register with said apertures and a position outside and beyond the fully open end of said housing, a third dog means carried by the housing to retain one mount within said housing while another is being moved to an outer position, and stop means carried by the housing both inward of said partly open end and at all times between the feed plate and the handle and engaged by opposed portions of the ram unit to limit the mentioned positions of said unit.

3. Mount-feeding means according to claim 1 in which a mount being moved into the housing is on one side of the feed plate and a mount being moved out of the housing is on the opposite side, and means disposed beyond the fully open end of the housing to separate the mounts to be fed into the housing from those returned from the housing to leave a clear path of movement for returning mounts.

4. Mount-feeding means comprising a housing having a passage fully open at one end and partly open at the other end, light-passing apertures in said housing intermediate its ends, a ram unit longitudinally movable in said passage and provided with a feed plate movable between a position extending through said fully open end of the housing and a position in register with said apertures, said ram being provided with a handle extending from said feed plate through the partly open end of the housing, said handle closing said end of the housing when said feed plate is in the position beyond the fully open end of the housing, first dog means on said plate to engage an edge of a mount to move the same between a position outside and beyond the fully open end of said housing and a position within the housing and in register with said light-passing apertures, second dog means on said plate to engage an edge of a mount to move the same between a position within the housing and in register with said apertures and a position outside and beyond the fully open end of said housing, a third dog means carried by the housing to retain one mount within said housing while another is being moved to an outer position, and spring members carried by the housing and directed to bias a mount in the housing to a position clear of the path of movement of the feed plate and the mount being fed thereby.

5. In a mount-feeding device, a flat housing apertured for viewing a mount therethrough that is registered with the aperture, a feed plate in said housing to engage and successively move mounts into and out of viewing position, said housing having an open end, stop means disposed to partly close said open end, elongated members extending from the feed plate through said open end of the housing, and a handle connecting said members and disposed beyond the open end of the housing, said stop means engaging the feed plate when the same is in position to place a mount in viewing position relative to the apertures of the housing and engaging the handle to limit the position of the feed plate when moving a mount out of register with said apertures.

6. Mount-feed means comprising a flat housing fully open at one end, a slide having a wall transverse to the housing and in which the fully open end of the housing opens, a slide plate along one edge of the transverse wall and adapted to support a complement of mounts disposed in edge abutment with said transverse wall, light-passing apertures in said housing intermediate its ends, a ram longitudinally movable in said housing and provided with a feed plate movable between a position extending through said fully open housing end and between two mounts on the slide plate and a position in register with said apertures, said ram being provided with a handle extending from said feed plate through the end of the housing opposite the fully open end thereof, said handle closing said opposite end when the feed plate is positioned in the slide beyond the mentioned transverse wall, said handle constituting means to move said ram unit, first dog means on the edge of said plate that is directed toward the housing opening to engage an edge of a mount supported on the slide plate and to move said mount from a position on the slide plate beyond the mentioned transverse wall to a position within the housing and in register with said light-passing apertures, second dog means on said plate to engage an edge of a mount within the housing to move the same between a position within said housing and in register with said apertures and a position outside and beyond the fully open end of the housing, and a third dog means carried by the housing to retain one mount within said housing while another is being moved to an outer position.

References Cited in the file of this patent

UNITED STATES PATENTS

| | | |
|---|---|---|
| 1,159,681 | Kastner | Nov. 9, 1915 |
| 2,482,117 | Leas | Sept. 20, 1949 |
| 2,513,102 | Parlini et al. | June 27, 1950 |
| 2,525,564 | Simmons | Oct. 10, 1950 |
| 2,549,898 | Fish | Apr. 24, 1951 |
| 2,583,442 | Parlini et al. | Jan. 22, 1952 |